Figure 4:
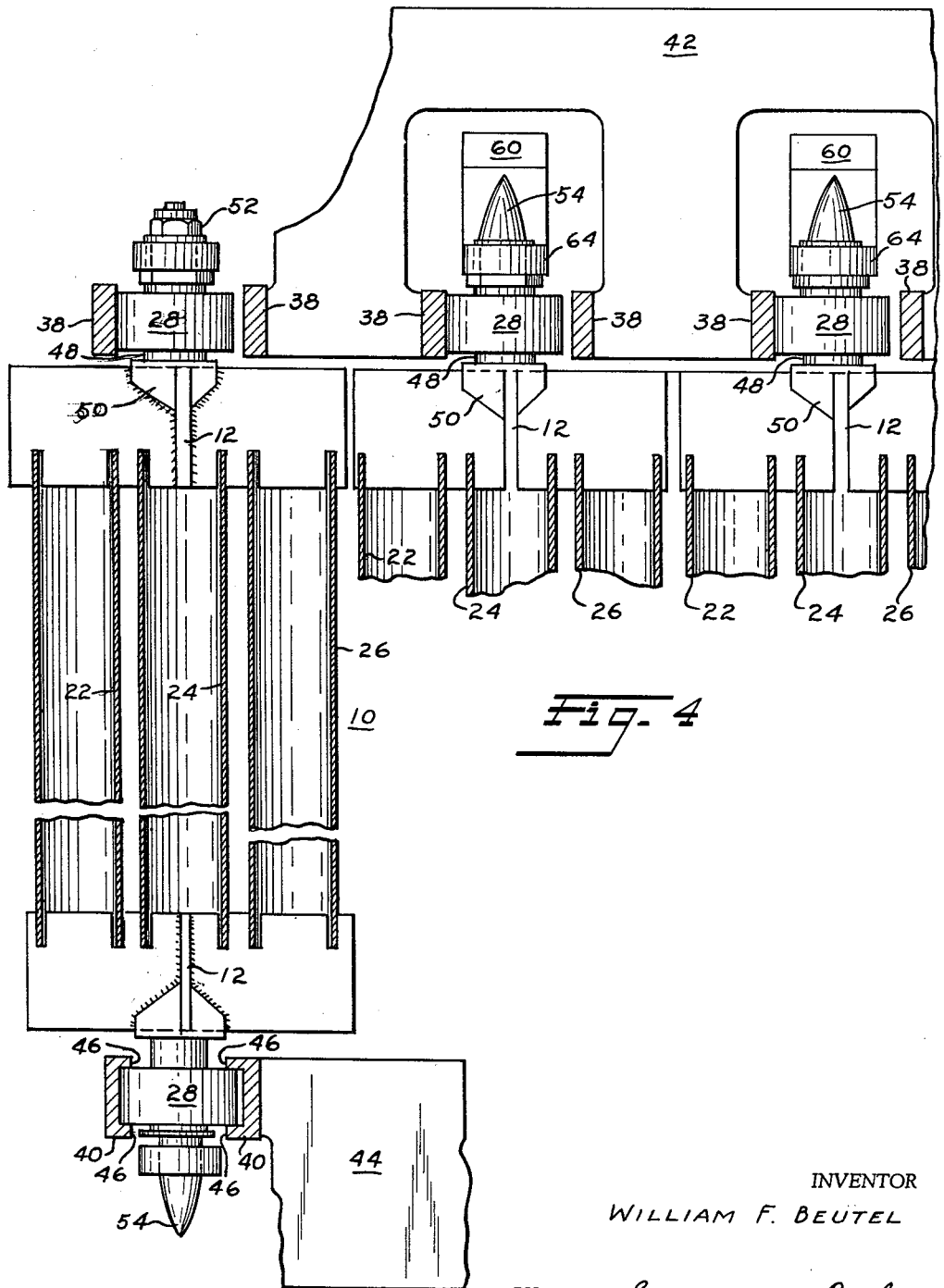

Jan. 26, 1965
W. F. BEUTEL
3,167,484
FLEXIBLE FUEL BUNDLE FOR CONTINUOUSLY REFUELED NUCLEAR REACTORS
Filed Dec. 12, 1961
4 Sheets-Sheet 1
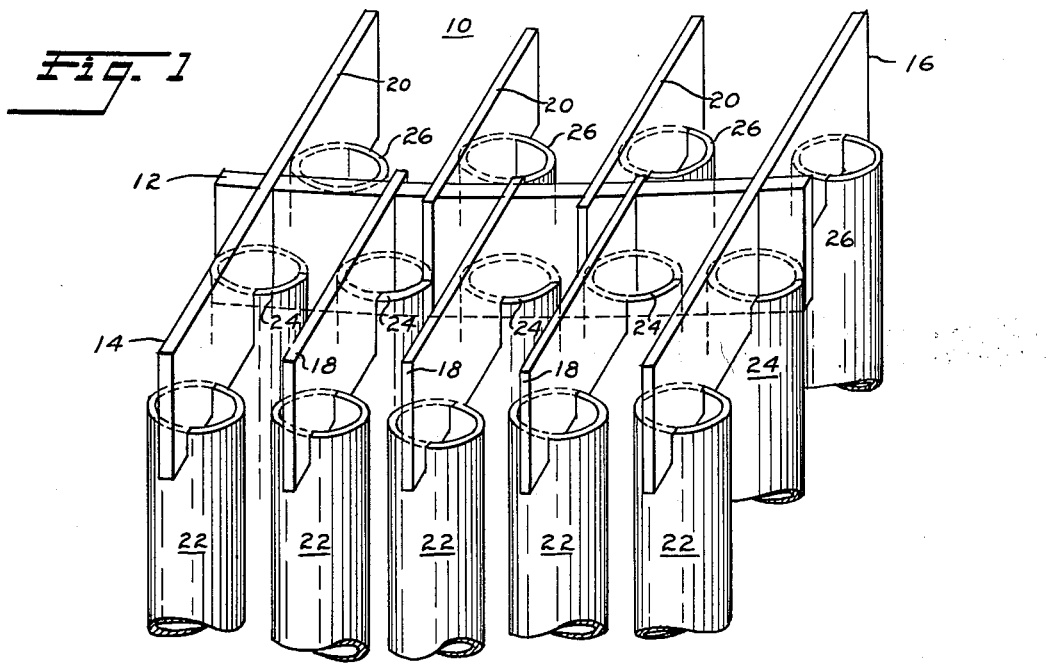
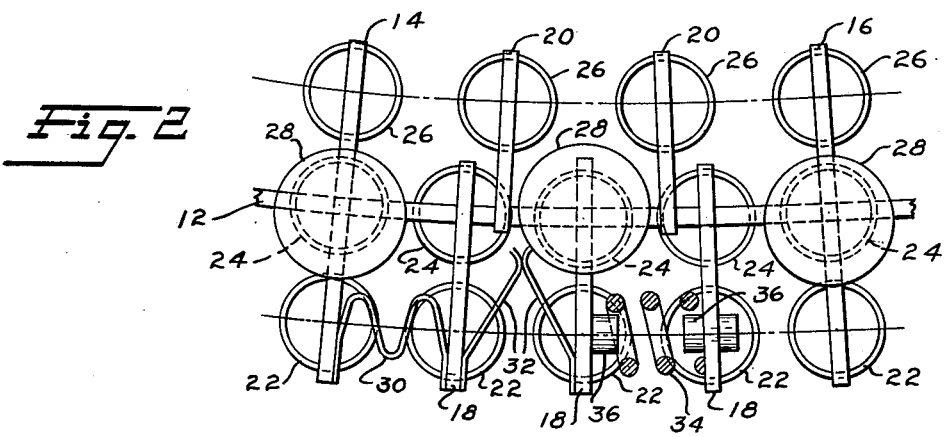
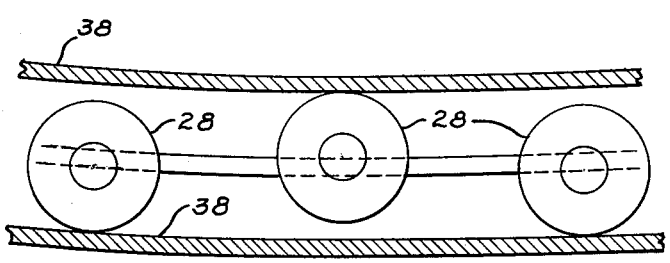
INVENTOR
WILLIAM F. BEUTEL
BY Scrivener & Parker
ATTORNEYS

INVENTOR
WILLIAM F. BEUTEL

BY Scrivener & Parker

ATTORNEY

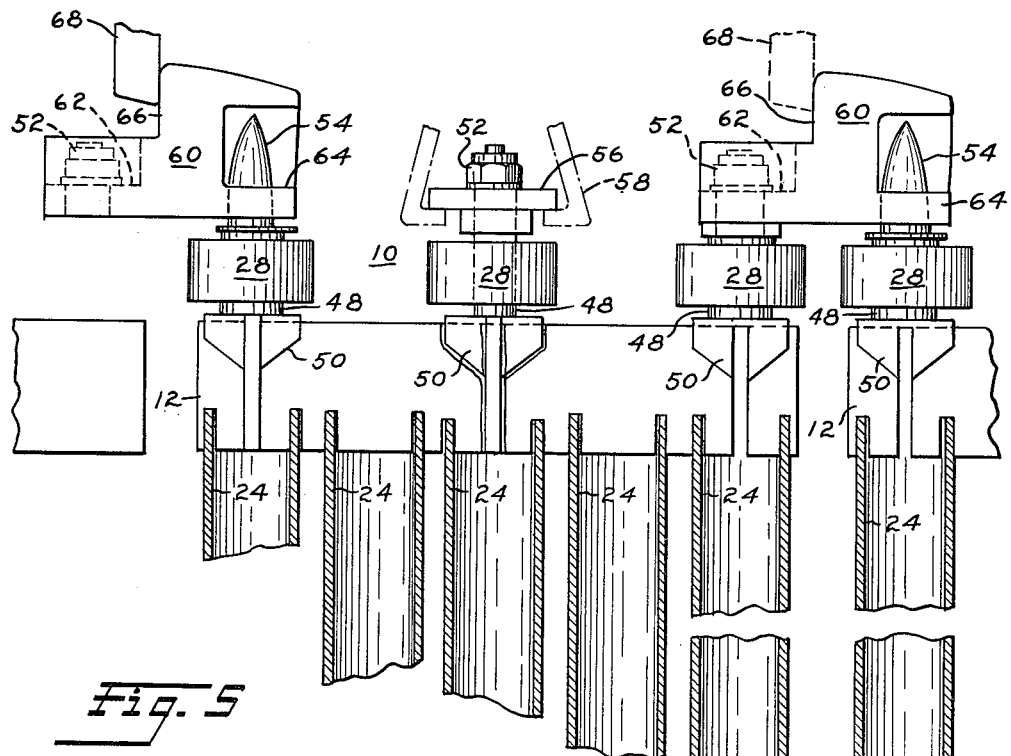
Fig. 5
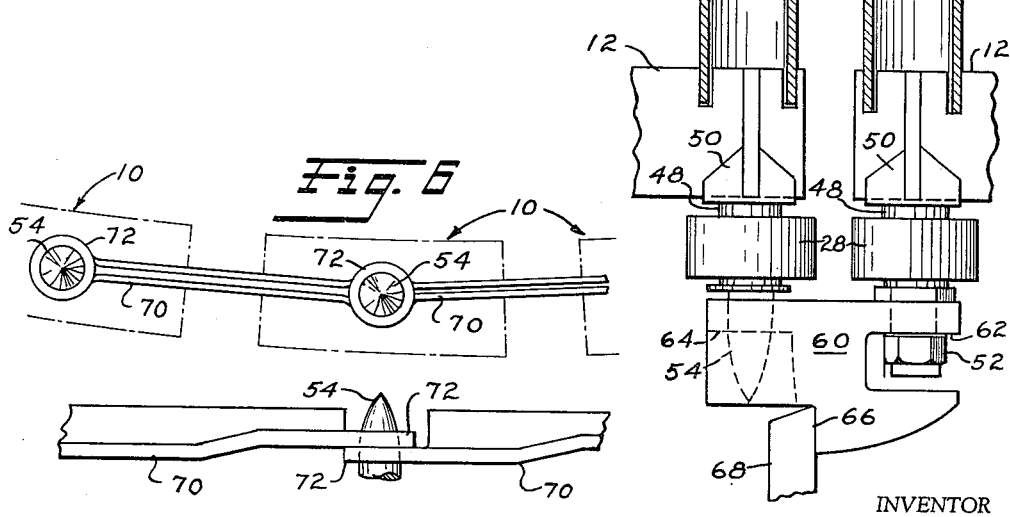
Fig. 6
Fig. 7
INVENTOR
WILLIAM F. BEUTEL
BY Scrivener & Parker
ATTORNEYS Jan. 26, 1965

W. F. BEUTEL 3,167,484

FLEXIBLE FUEL BUNDLE FOR CONTINUOUSLY
REFUELED NUCLEAR REACTORS

Filed Dec. 12, 1961

4 Sheets-Sheet 4

INVENTOR
WILLIAM F. BEUTEL

BY Scrivener & Parker
ATTORNEYS

United States Patent Office 3,167,484
Patented Jan. 26, 1965

1

3,167,484
FLEXIBLE FUEL BUNDLE FOR CONTINUOUSLY REFUELED NUCLEAR REACTORS
William F. Bentel, Baltimore, Md., assignor to Martin-Marietta Corporation, Baltimore, Md., a corporation of Maryland
Filed Dec. 12, 1961, Ser. No. 158,696
9 Claims. (Cl. 176—87)

This invention relates to fuel bundles for nuclear reactors and more particularly to flexible fuel bundles for nuclear reactors of the continuously refueled type.

In continuously refueled nuclear reactors fresh fuel elements, often referred to as fuel rods, must be inserted into the reactor core as previously inserted fuel elements are burned up. In such a reactor, to maintain efficient refueling, the core must be subdivided into readily replaceable sub-assemblies called fuel bundles whereby a plurality of fuel elements may simultaneously be removed and subsequenty be replaced.

In the example shown and generally described herein the fuel bundles are progressively fed to the reactor core from the outer periphery to the center thereof, or vice-versa, by means of continuous spiral tracks adapted to receive a plurality of bundles in tandem. Suitable motivating means may also be provided for exerting a pushing force or the like on the most recently inserted bundles in the spiral feed tracks, whereby all of the bundles therein may be indexed along the said tracks. The co-pending application by Jack A. Hunter and John B. Mangieri entitled "Continuously Refueled Nuclear Reactors" Serial No. 229,411 filed October 9, 1962, relates to a type of continuously refueled nuclear reactor which would advantageously employ the flexible fuel bundle of the present invention. It may be noted that Jack A. Hunter, John B. Mangieri and the inventor of the present invention are employees of Martin-Marietta Corporation to which corporation, its successors and assigns, all rights, title and interest in and to both of these inventions have been assigned.

Prior art fuel bundles for use in conventional reactor cores are not adaptable to continuous refueling operations.

In the first place, they are of rigid construction and will not conform to the changing contours of a spiral track, such as will be hereinafter described, and, in the second place, since the problem of continuous refueling has not been provided for in the fuel bundle art, no consideration has yet been given to maintaining an optimum spacing of the fuel elements wherein the contour of the feed tracks and hence, the fuel bundles, is variable.

It is an object of this invention to provide a fuel bundle for continuously refueled nuclear reactors.

Another object of this invention is to provide a fuel bundle for continuously refueled nuclear reactors of the type including a variable contour feed track for mounting and progressively feeding a plurality of such fuel bundles into the reactor core.

Still another object of this invention is to provide a fuel bundle for continuously refueled nuclear reactors of the type including a variable contour feed track for mounting and progressively feeding a plurality of such fuel bundles into the reactor core, wherein the said fuel bundle is flexible to conform to the variable contour of the track and simultaneously maintain an optimum spacing between the fuel elements carried in the said bundle.

These and other objects of the invention will become apparent with reference to the following specification and drawings, which relate to preferred embodiments of the invention.

Figure 8:
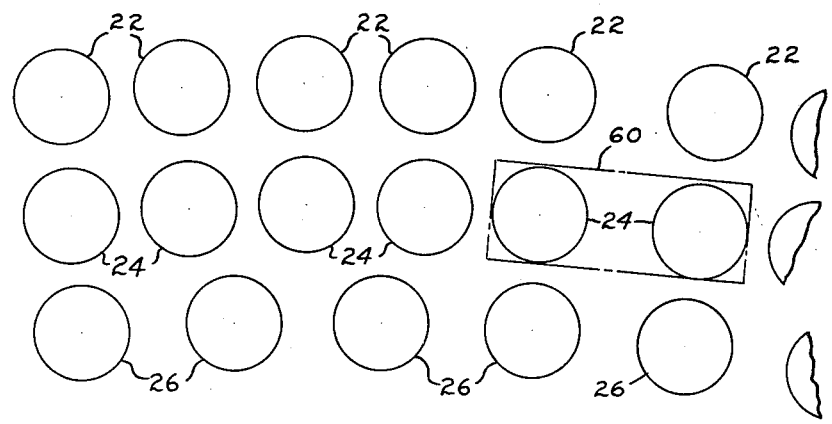
Figure 9:
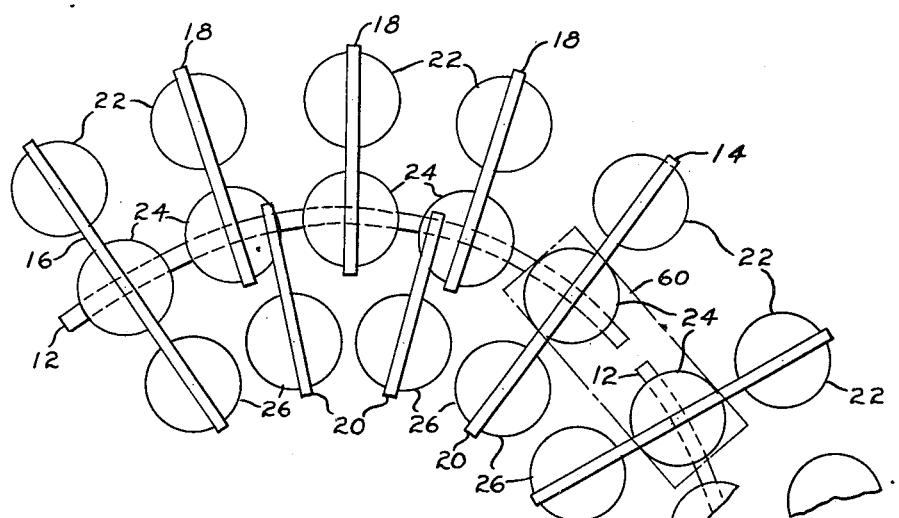

In the drawings:
FIGURE 1 is a perspective of the general framework of a fuel bundle of the present invention;
FIGURE 2 is a top plan view of a fuel bundle of the present invention;
FIGURE 3 is a schematic showing a detail of a fuel bundle cooperating with a feed track;
FIGURE 4 is a detailed end view in partial cross section of the invention;
FIGURE 5 is a detailed side elevation in partial cross section of the invention;
FIGURE 6 is a top schematic of another embodiment of a detail of FIGURE 5;
FIGURE 7 is a side elevation of a detail of FIGURE 6;
FIGURE 8 is a schematic showing a fuel bundle of the present invention conforming to one feed track contour; and
FIGURE 9 is a schematic showing a fuel bundle of the present invention conforming to another feed track contour.

Referring in detail to the drawings and more particularly to FIGURE 1, the fuel bundle 10 is shown as generally comprising a flexible center rib 12, cross ribs 14 and 16 located one on either end, respectively, of the flexible center rib 12 and extending on both sides of the said center rib 12, a plurality of generally parallel cross ribs 18 extending from one side of the flexible center rib 12 and a like plurality of generally parallel cross ribs 20 extending from the other side of the flexible center rib 12, the cross ribs 20 being staggered with respect to the cross ribs 18. The cross ribs 14, 16, 18 and 20 may all be joined to the flexible center rib 12 by means of tongue and groove type connections. Also, the cross ribs 14, 16, 18 and 20 are made substantially rigid in comparison to the flexibility of the flexible center rib 12.

As shown in FIGURES 1 and 2, the fuel elements (not shown) are carried in a plurality of elongated fuel tubes comprising a first row of fuel tubes 22 mounted on one side of the center rib 12 on the outer ends of the cross ribs 14, 18 and 16, a second row of fuel tubes 24 mounted on the flexible center rib 12, and a third row of fuel tubes 26 mounted on the other side of the center rib 12 on the outer ends of the cross ribs 14, 20 and 16. Again, tongue and groove type connections may be used to hold the fuel tubes and rib members together.

It should be noted that there is a lesser number of fuel tubes in the row 26 than there is in either of the rows 22 or 24. The purpose for this will be hereinafter described.

It should also be noted that the rib, and roller structures shown in FIGURES 1 and 2 are for the upper half only of the fuel bundle 10. These structures are symmetrically repeated at the bottom of the tubes 22, 24 and 26 to complete the bundle structure. This is best shown in FIGURES 4 and 5.

Referring specifically to FIGURE 2, a plurality of rollers or roller bearings 28 are mounted with their axes parallel to but offset with respect to a vertical plane taken through the longitudinal axis of the center rib 12. With respect to FIGURE 2, the vertical direction would be directly into or out of the plane of the drawing. Alternate ones of the rollers 28 are offset to opposite sides of the center rib 12.

Still referring to FIGURE 2, it is shown therein that between the ends of the cross ribs 14, 18 and 16 are interposed a plurality of compression springs shown as comprising a zig-zag leaf spring 30 between one end of the rib 14 and a rib 18, a pair of opposed cantilever leaf springs 32 between the next two cross ribs 18, and a coil spring 34 mounted on integral axial studs 36 on the cross ribs 18 between the next consecutive pair of cross ribs 18. While this showing is rather unconventional in the use of more than one type of compression spring, it is included as the means of best illustrating a number of embodiments suitable for the purpose. These springs 30, 32 and 34 are placed to aid the fuel bundle 10 in conforming to a contour having its short radius located along the line of fuel tubes 26. The springs 30, 32 and 34 prevent binding between the fuel bundle and the feed tracks (to be hereinafter described) and act to absorb vibrations by their natural damping action.

Referring now to FIGURES 3 and 4, the feed tracks are shown as comprising upper track pairs 38 and lower track pairs 40 between which the rollers 28 on the fuel bundles 10 are positioned. The feed tracks, as shown, are integrally formed or mounted with respect to upper and lower frame members 42 and 44, respectively.

The lower feed track pairs 40 are inwardly flanged as shown at 46 to supportably receive the lower rollers 28 of the fuel bundles 10 whereby a supporting function as well as a guide function is provided by the said lower track pairs 40.

The upper feed track pairs 38 are not flanged and present only plane inner surfaces to the upper rollers 28 on the bundles 10 to provide only a guiding function for the bundles 10.

As shown in both FIGURES 3 and 4, the rollers 28 alternately engage one or the other of the inner track surfaces of the upper and lower track pairs 38 and 40. The use of three rollers 28 in each of the bundles 10, as schematically shown in FIGURE 3, with the outside two rollers 28 offset to the side of the bundle 10 and juxtaposed with the feed track having the large contour radius and the centrally located roller 28 offset to the opposite side of the bundle and juxtaposed with the feed track having the smaller contour radius, readily provides a means by which the bundle 10 may be flexed along the flexible center ribs 12 thereof by the action of the feed tracks 38 and 40 on the rollers 28. In this connection, the centrally located roller is used as the fulcrum point about which the flexible center rib 12 is flexed.

Referring now to FIGURES 4 and 5, the rollers 28 are shown as being mounted on spindles 48 which are attached to the flexible center ribs 12 of the fuel bundles 10 by means of individual integral welded brackets 50.

As specifically illustrated in FIGURE 5, on the right hand side thereof, the spindles 48 on the extreme ends of the bundles 10 are alternately capped top and bottom with a conventional cap nut 52 and a spire-shaped pintle nut 54, respectively. The adjacent ends of each bundle 10 are oppositely staggered as to the relative positions of the cap nuts 52 and pintles 54 for a purpose to be hereinafter described.

In this embodiment, the centrally located spindles 48 are capped with the conventional cap nuts 52 and in addition include a wide washer or flange member 56 which may be engaged by a bundle stabilizing or propelling grapple 58 or the like.

On the extreme end spindles 48 having conventional cap nuts 52 thereon, a drag link 60 is positioned having a recessed horizontal seat 62 on one end thereof which is bored-out to receive the spindle 48 and is engaged by the lower surface of the cap nut 52 thereon to retain the drag link 60 on the spindle 48.

On the other end of the drag links 60 is a tongue member 64 having a bore therein for removably and pivotally receiving the spire-shaped pintles 54. This permits adjacent bundles 10 to be readily connected together by lowering one bundle with its upper connected drag link 60 and lower exposed pintle 54 into engagement with the end of another bundle to engage the upper exposed pintle 54 of the other bundle with the drag link 60 of the said one bundle and insert the said lower exposed pintle 54 of the said one bundle into the lower connected drag link 60 of the said other bundle by means of the grapple 58 engaging the washer or flange member 56 on the centrally located spindle 48 on the bundle 10.

The drag links 60 are additionally provided with upstanding shoulders 66 adjacent the horizontal shoulders 62 thereon, whereby, as shown in FIGURE 5, pusher bars 68 or the like may be used to engage the said upstanding shoulders 66 on the drag links 60 to propel the bundles 10 along the feed tracks 38 and 40.

Another embodiment with respect to the bundle, pintle and drag link connections is shown in FIGURES 6 and 7.

In FIGURE 6, the bundles 10 are schematically shown with pintles 54 centrally located thereon. The bundles 10 are here connected via the centers thereof by a plurality of elongated drag lines 70 having bored end flanges 72 which fit over the pintles 54 to connect the bundles 10. As shown in FIGURE 7, the end flanges 72 are shaped so as to be stacked on the pintles 54 so as to be readily able to connect one bundle 10 with both a leading and a trailing bundle in the feed sequence of the nuclear reactor (not shown) via the elongated drag links 70.

*Operation*

Referring now to FIGURES 2, 3, 4 and 5, and in addition to FIGURES 8 and 9, as the fuel bundles 10 are progressed along the pairs of feed tracks 38 and 40 by the action of the pusher bars 68 on the drag links 60, the rollers 28, as previously described in connection with FIGURE 3, are forcibly engaged by the inner surfaces of the track pairs 38 and 40 to cause the bundles 10 to flex along the flexible center rib 12 and assume the contour of the particular section of the variable contour feed track in which the bundle 10 is presently located.

This contour may vary from a very gradual curve such as schematically shown in FIGURE 8 to a sharp or sudden bend such as that shown in FIGURE 9.

The reason for the lesser number of fuel tubes 26 on the short radius side of the contour and the staggered arrangement of the cross ribs 18 and 20 supporting the fuel tubes 22 and 26, respectively, will now become more apparent.

As the contour of the tracks becomes more acute, such as shown in FIGURE 9, the cross ribs 18 and 20 assume substantially radial positions with respect to the bend in the flexible center ribs 12 of the bundle 10. Thus, the outer ends of the cross ribs 20 and the corresponding ends of the end cross ribs 14 and 16 carrying the lesser number of fuel tubes 26 move closer together and the fuel tubes 22 farther apart as the contour becomes more acute. The tubes 24 on the center rib 12, of course maintain a substantially constant spacing. Since the more acute contour exists toward that portion of the reactor core wherein the fuel rods or elements carried by the fuel tubes 22, 24 and 26 are more actively consumed by reaction, the bundles 10 are so dimensioned that they assume a shape to provide the most efficient spacing of the fuel rods or elements held by the tubes 22, 24 and 26.

As can be seen from the foregoing specification and drawings this invention provides a new and novel fuel bundle for continuously refueled nuclear reactors, wherein a plurality of such bundles are fed in tandem relation along variable contour feed tracks in the reactor core, the said bundle being flexible and adapted to conform to the said variable contour of the feed tracks and simultaneously vary the spacing of the fuel elements carried thereby to provide optimum efficiency in the reaction area of the core.

It is to be understood that the embodiments shown and described herein are for the purpose of example only and are not intended to limit the scope of the appended claims.

What is claimed is:

1. In a fuel bundle for a continuously refueled nuclear reactor having a variable contour feed track along which said fuel bundle is progressed, the improvement comprising:

(a) a plurality of fuel tubes;

(b) flexible means connecting said fuel tubes in a spaced-apart parallel arrangement perpendicular to the path of said contour feed track; and (c) bearing means mounted on said flexible means to engageably follow said feed track and to cause said flexible means and said parallel arrangement of said fuel tubes supported therefrom to conform to the variable contour of said feed track as said fuel bundle progresses therealong.

2. The article of claim 1 wherein said flexible means includes:

(a) an elongated flexible center rib extending perpendicularly to the longitudinal axes of said fuel tubes;

(b) a plurality of coplanar cross ribs extending transversely of said center rib; and (c) means on said center rib and said cross ribs for supportably receiving said fuel tubes.

3. The article of claim 1 including additionally connecting means mounted to said flexible means whereby said fuel bundle may be releasably connected in tandem with a plurality of similar other said fuel bundles and propelled therewith along said feed track.

4. In a fuel bundle for a continuously refueled nuclear reactor having a variable contour feed track including a pair of parallel runners along which said fuel bundle is progressed, the improvement comprising:

(a) a plurality of fuel tubes;

(b) flexible means connecting said fuel tubes in a spaced-apart parallel arrangement perpendicular to the path of said contour feed track; and (c) a plurality of rollers journaled to said flexible means with their axes of rotation parallel to the longitudinal axes of said fuel tubes and alternately off-set with respect to the center line between said parallel runners whereby alternate ones of said rollers will engageably follow alternate ones of said parallel runners to cause said flexible means and said parallel arrangement of said fuel tubes supported therefrom to conform to the variable contour of said feed track as said fuel bundle progresses therealong.

5. In a fuel bundle for a continuously refueled nuclear reactor having a pair of parallel spaced-apart spiraled feed tracks along which said bundle is progressed, the improvement comprising:

(a) a pair of flexible supporting members each comprising an elongated flexible center rib to which are connected a coplanar pair of cross ribs located one on either end of said flexible center rib extending transversely on both sides of said flexible center rib, a first set of spaced coplanar cross ribs intermediate said pair of cross ribs and coplanar therewith extending transversely of said flexible center rib on one side thereof, and a second set of spaced coplanar cross ribs intermediate of said pair of cross ribs and coplanar therewith extending transversely of said flexible center rib on the opposite side thereof and being one more in number, closer spaced and staggered with respect to said first set of cross ribs;

(b) a plurality of parallel fuel tubes disposed between said pair of flexible supporting members in a first, second and third row, the opposite ends of each said fuel tube in said second row connected to said flexible center rib of one of said pair of flexible supporting members and the opposite ends of each said fuel tube in said first and said third rows connected to one of said cross ribs of one of said pair of flexible supporting members extending from said one side and said opposite side of said flexible center rib, respectively, whereby said third row includes one more said fuel tube than said first row; and (c) bearing means mounted on each said flexible supporting member on the side thereof disposed from said fuel tubes to engageably follow one of said pair of parallel spaced-apart spiraled feed tracks, respectively, to cause said flexible supporting members and the arrangement of said parallel fuel tubes disposed therebetween to conform to the contour of said feed tracks as said fuel bundle progresses therealong.

6. The article of claim 5 including additionally connecting means mounted to at least one of said pair of flexible supporting members whereby said fuel bundle may be releasably connected in tandem with a plurality of similar other said fuel bundles and propelled therewith along said feed tracks.

7. The article of claim 6 wherein each one of said pair of parallel spaced-apart spiraled feed tracks includes a pair of parallel runners and said bearing means includes a plurality of rollers journaled to each said flexible supporting member on the side thereof disposed from said fuel tubes with their axes of rotation parallel to the longitudinal axes of said fuel tubes and alternately off-set in opposite directions from said flexible center rib whereby alternate ones of said rollers will engageably follow alternate ones of said parallel runners of their respective adjacent one of said pair of said feed tracks to cause said pair of flexible supporting members and the arrangement of said plurality of parallel fuel tubes connected thereto to conform to the contour of said feed tracks with said first row of said fuel tubes disposed closer than said third row to the center of the spiral of said feed tracks as said fuel bundle progresses therealong, said fuel tubes continuously substantially maintaining their proper spacing with respect to each other.

8. A fuel bundle for a continuously refueled nuclear reactor having a pair of parallel spaced-apart spiraled feed tracks along which said bundle is progressed and each of which includes a pair of parallel runners, comprising:

(a) a pair of flexible supporting members each comprising an elongated flexible center rib to which are connected a coplanar pair of cross ribs located one on either end of said flexible center rib extending transversely on both sides of said flexible center rib, a first set of spaced coplanar cross ribs intermediate said pair of cross ribs and coplanar therewith extending transversely of said flexible center rib on one side thereof, and a second set of spaced coplanar cross ribs intermediate of said pair of cross ribs and coplanar therewith extending transversely of said flexible center rib on the opposite side thereof and being one more in number, closer spaced and staggered with respect to said first set of cross ribs;

(b) a plurality of parallel fuel tubes disposed between said pair of flexible supporting members in a first, second and third row, the opposite ends of each said fuel tube in said second row connected to said flexible center rib of one of said pair of flexible supporting members and the opposite ends of each said fuel tube in said first and said third rows connected to one of said cross ribs of one of said pair of flexible supporting members extending from said one side and said opposite side of said flexible center rib, respectively, whereby said third row includes one more said fuel tube than said first row;

(c) spring means interposed between adjacent said cross ribs connected to said third row of said fuel tubes to exert a force through said flexible supporting members urging said fuel tubes in said third row away from each other and urging said fuel tubes in said first row toward each other;

(d) three rollers journaled to each said flexible supporting member on the side thereof disposed from said fuel tubes with their axes of rotation parallel to the longitudinal axes of said fuel tubes and alternately off-set in opposite directions from said flexible center rib with the axis of rotation of the center roller thereof located on the side of said flexible center rib adjacent said first row of said fuel tubes whereby alternate ones of said rollers will engageably follow alternate ones of said parallel runners of their respective adjacent one of said pair of feed tracks to cause said pair of flexible supporting members and the arrangement of said plurality of parallel fuel tubes connected thereto to conform to the contour of said feed tracks with said first row of said fuel tubes disposed closer than said third row to the center of the spiral of said feed tracks as said fuel bundle progresses therealong, said fuel tubes continually substantially maintaining their proper spacing with respect to each other;

(e) a pintle mounted at one end of each said flexible supporting member in opposite order with respect to each other; and (f) a drag link mounted at the other end of each said flexible supporting member in opposite order with respect to each other, each said drag link having a cavity therein capable of releasably receiving a similar type of said pintle whereby said fuel bundle may be releasably connected in tandem with a plurality of similar other said fuel bundles and propelled therewith along said feed tracks.

9. A fuel bundle for a continuously refueled nuclear reactor having a pair of parallel spaced-apart spiraled feed tracks along which said bundle is progressed and each of which includes a pair of parallel runners, comprising:

(a) a pair of flexible supporting members each comprising an elongated flexible center rib to which are connected to a coplanar pair of cross ribs located one on either end of said flexible center rib extending transversely on both sides of said flexible center rib, a first set of spaced coplanar cross ribs intermediate said pair of cross ribs and coplanar therewith extending transversely of said flexible center rib on one side thereof, and a second set of spaced coplanar cross ribs intermediate of said pair of cross ribs and coplanar therewith extending transversely of said flexible center rib on the opposite side thereof and being one more in number, closer spaced and staggered with respect to said first set of cross ribs;

(b) a plurality of parallel fuel tubes disposed between said pair of flexible supporting members in a first, second and third row, the opposite ends of each said fuel tube in said second row connected to said flexible center rib of one of said pair of flexible supporting members and the opposite ends of each said fuel tube in said first and said third rows connected to one of said cross ribs of one of said pair of flexible supporting members extending from said one side and said opposite side of said flexible center rib, respectively, whereby said third row includes one more said fuel tube than said first row;

(c) spring means interposed between adjacent said cross ribs connected to said third row of said fuel tubes to exert a force through said flexile supporting members urging said fuel tubes in said third row away from each other and urging said fuel tubes in said first row toward each other;

(d) three rollers journaled to each said flexible supporting member on the side thereof disposed from said fuel tubes with their axes of rotation parallel to the longitudinal axes of said fuel tubes and alternately off-set in opposite directions from said flexible center rib with the axis of rotation of the center roller thereof located on the side of said flexible center rib adjacent said first row of said fuel tubes whereby alternate ones of said rollers will engageably follow alternate ones of said parallel runners of their respective adjacent one of said pair of feed tracks to cause said pair of flexible supporting members and the arrangement of said plurality of parallel fuel tubes connected thereto to conform to the contour of said feed tracks with said first row of said tubes disposed closer than said third row to the center of the spiral of said feed tracks as said fuel bundle progresses therealong, said fuel tubes continually substantially maintaining their proper spacing with respect to each other; and (e) a pintle mounted on the side of at least one of said flexible supporting members disposed from said fuel tubes to permit said fuel bundle to be releasably connected in tandem with a plurality of similar other said fuel bundles and propelled therewith along said feed tracks.

References Cited by the Examiner

UNITED STATES PATENTS 2,571,643 10/51 Youhouse _____ 198—131 X
2,762,496 9/56 McCaul _____ 198—181 X

FOREIGN PATENTS 852,028 10/60 Great Britain.

CARL D. QUARFORTH, *Primary Examiner.*

REUBEN EPSTEIN, *Examiner.*